(12) United States Patent
Hai (10) Patent No.: US 12,517,394 B2
(45) Date of Patent: Jan. 6, 2026

(54) POLARIZER AND DISPLAY DEVICE

(71) Applicant: TCL CHINA STAR OPTOELECTRONICS TECHNOLOGY CO., LTD., Guangdong (CN)

(72) Inventor: Bo Hai, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 365 days.

(21) Appl. No.: 17/755,147

(22) PCT Filed: Mar. 14, 2022

(86) PCT No.: PCT/CN2022/080671
§ 371 (c)(1),
(2) Date: Apr. 21, 2022

(87) PCT Pub. No.: WO2023/168725
PCT Pub. Date: Sep. 14, 2023

(65) Prior Publication Data
US 2024/0134224 A1 Apr. 25, 2024
US 2024/0231143 A9 Jul. 11, 2024

(30) Foreign Application Priority Data

Mar. 7, 2022 (CN) .......................... 202210215272.8

(51) Int. Cl.
*G02F 1/1335* (2006.01)
*G02B 5/30* (2006.01)

(52) U.S. Cl.
CPC ..... *G02F 1/133528* (2013.01); *G02B 5/3016* (2013.01)

(58) Field of Classification Search
CPC .............. G02F 1/133528; G02B 5/3016
See application file for complete search history.

(56) References Cited

U.S. PATENT DOCUMENTS

| | | | | |
|---|---|---|---|---|
| 6,093,344 A | * | 7/2000 | Park ................. | C09K 19/3852 349/92 |
| 6,995,823 B1 | * | 2/2006 | Kelly ................ | G02F 1/133632 349/120 |

(Continued)

FOREIGN PATENT DOCUMENTS

| CN | 2852187 Y | 12/2006 |
|---|---|---|
| CN | 101276085 A | 10/2008 |

(Continued)

OTHER PUBLICATIONS

International Search Report in International application No. PCT/CN2022/080671, mailed on Jun. 27, 2022.

(Continued)

*Primary Examiner* — Jennifer D. Carruth
*Assistant Examiner* — Agnes Dobrowolski
(74) *Attorney, Agent, or Firm* — PV IP PC; Wei Te Chung (57) ABSTRACT

A polarizer and a display device are disclosed in the present application. The polarizer of the present application adopts a structure in which a liquid crystal compensation layer and a polarizing layer are stacked on each other, and the liquid crystal compensation layer is used to compensate the birefringence of the liquid crystal molecules in the liquid crystal layer, and the liquid crystal compensation layer adjusts the compensation value by the refractive index difference of the liquid crystal molecules and the thickness, so that the adjustment range is wide, and the adjustment range may be matched with the high phase difference of the display device, thereby improving the side-view light leakage of the (Continued)

liquid crystal display in the dark state, improving the contrast of the liquid crystal display, and improving the image quality.

7 Claims, 7 Drawing Sheets

(56) References Cited

U.S. PATENT DOCUMENTS

| | | | | |
|---|---|---|---|---|
| 2009/0219455 | A1* | 9/2009 | Maruyama | G03B 21/14 349/5 |
| 2009/0257004 | A1* | 10/2009 | Song | G02B 5/3016 349/96 |
| 2016/0299371 | A1* | 10/2016 | Kim | G02F 1/13363 |
| 2020/0124921 | A1* | 4/2020 | Hai | G02F 1/133634 |

FOREIGN PATENT DOCUMENTS

| | | |
|---|---|---|
| CN | 101414023 A | 4/2009 |
| CN | 201562098 U | 8/2010 |
| CN | 102830547 A | 12/2012 |
| CN | 105717573 A | 6/2016 |
| CN | 107966846 A | 4/2018 |
| JP | 2001083323 A | 3/2001 |
| JP | 2009139712 A | 6/2009 |

OTHER PUBLICATIONS

Written Opinion of the International Search Authority in International application No. PCT/CN2022/080671, mailed on Jun. 27, 2022.
Chinese Office Action issued in corresponding Chinese Patent Application No. 202210215272.8 dated Sep. 1, 2022, pp. 1-7.

* cited by examiner

POLARIZER AND DISPLAY DEVICE

FIELD OF INVENTION

The present application relates to a field of display technology, and in particular to a polarizer and a display device.

BACKGROUND OF INVENTION

A side-view contrast of an existing vertical alignment liquid crystal display device is poor, thereby affecting the image quality of the liquid crystal display device. In particular, with the development of high dynamic range image televisions, there are higher requirements on the contrast of liquid crystal display devices, and improving the contrast of liquid crystal display devices is the development trend of the panel industry in the future.

The poor side-view contrast of the existing vertical alignment liquid crystal display device is mainly caused by side-view light leakage in a dark state. As the viewing angle of the thin film transistor liquid crystal display device increases, the contrast of the picture is reduced continuously, and the definition of the picture is reduced. This is because the birefringence of the liquid crystal molecules in the liquid crystal layer changes with the observation angle, and using a wide viewing angle compensation film for compensation may effectively reduce the light leakage of the dark screen and greatly improve the contrast of the picture within a certain viewing angle range. The compensation principle of the compensation film is to correct the phase difference generated by the liquid crystal at different viewing angles, so that the birefringence properties of the liquid crystal molecules may be compensated symmetrically. However, in conventional compensation films, optical compensation is employed, and the optical compensation adjusts the compensation value by stretching the film layer. Due to the limitation of film stretching, the compensation value is also limited, which cannot be matched with the phase difference of the vertical alignment liquid crystal display device. Therefore, the improvement effect of the side-view light leakage in the dark state of the vertically alignment liquid crystal display device is limited.

SUMMARY OF INVENTION

Technical Problem

The present application provides a polarizer and a display device, so as to solve the problem that the improvement effect of side-view light leakage of the vertical alignment liquid crystal display device in the dark state is limited.

Technical Solution

The present application provides a polarizer including:
a first polarizing layer; and
a liquid crystal compensation layer, wherein the liquid crystal compensation layer and the first polarizing layer are stacked on each other.

Optionally, in some embodiments of the present application, the liquid crystal compensation layer includes a liquid crystal polymer.

Optionally, in some embodiments of the present application, the polarizer further includes a first protective layer disposed on a side of the first polarizing layer away from the liquid crystal compensation layer.

Optionally, in some embodiments of the present application, the polarizer further includes a first supporting layer located between the first polarizing layer and the liquid crystal compensation layer.

Optionally, in some embodiments of the present application, the polarizer further includes a second supporting layer located on a side of the liquid crystal compensation layer away from the first polarizing layer.

Optionally, in some embodiments of the present application, the material of the first protective layer is any one of cellulose triacetate, polymethyl methacrylate, or polyethylene terephthalate.

Accordingly, the present application further provides a display device including:
a first polarizer;
a second polarizer disposed opposite to the first polarizer; and
a liquid crystal display panel disposed between the first polarizer and the second polarizer, wherein,
the first polarizer includes the polarizer described above, and the liquid crystal compensation layer is located between the first polarizing layer and the liquid crystal display panel.

Optionally, in some embodiments of the present application, the second polarizer includes a second polarizing layer.

Optionally, in some embodiments of the present application, the second polarizer further includes a second protective layer disposed on a side of the second polarizing layer away from the liquid crystal display panel.

Optionally, in some embodiments of the present application, the second polarizer further comprises an optical compensation layer; the optical compensation layer is located between the second polarizing layer and the liquid crystal display panel.

Optionally, in some embodiments of the present application, the second polarizer further includes a third supporting layer located between the second polarizing layer and the liquid crystal display panel.

Optionally, in some embodiments of the present application, the display device further includes:
a first pressure sensitive adhesive layer attached to a side of the liquid crystal display panel adjacent to the first polarizer; and
a second pressure sensitive adhesive layer attached to a side of the liquid crystal display panel adjacent to the second polarizer.

Optionally, in some embodiments of the present application, the material of the second protective layer is any one of cellulose triacetate, polymethyl methacrylate, or polyethylene terephthalate.

Optionally, in some embodiments of the present application, the liquid crystal compensation layer includes a liquid crystal polymer.

Optionally, in some embodiments of the present application, the polarizer further includes a first protective layer disposed on a side of the first polarizing layer away from the liquid crystal compensation layer.

Optionally, in some embodiments of the present application, the polarizer further includes a first supporting layer located between the first polarizing layer and the liquid crystal compensation layer.

Optionally, in some embodiments of the present application, the polarizer further includes a second supporting layer located on a side of the liquid crystal compensation layer away from the first polarizing layer.

Optionally, in some embodiments of the present application, the material of the first protective layer is any one of cellulose triacetate, polymethyl methacrylate, or polyethylene terephthalate.

Optionally, in some embodiments of the present application, the first polarizer is a light incident side, and the second polarizer is a light emitting side.

Optionally, in some embodiments of the present application, the second polarizer is the light incident side, and the first polarizer is the light emitting side.

Advantageous Effects

A polarizer and a display device are provided in the present application, wherein the polarizer includes: a first polarizing layer; a liquid crystal compensation layer, wherein the liquid crystal compensation layer and the first polarizing layer are stacked on each other. The polarizer of the present application adopts a structure in which the liquid crystal compensating layer and the polarizing layer are stacked on each other, wherein the polarizing layer plays the role of polarizing light to polarize incident light to linearly polarized light, and the liquid crystal compensation layer is used to compensate the birefringence of liquid crystal molecules in the liquid crystal layer. The compensation value is not improved by stretching the liquid crystal compensation layer, but is adjusted by the refractive index difference of the liquid crystal molecules and the thickness, so that the adjustment range is large, the limitation is small, and the adjustment range may be matched with the high phase difference of the display device, thereby reducing the side-view light leakage of the liquid crystal display in the dark state, thus improving the contrast of the liquid crystal display, and the image quality.

DESCRIPTION OF DRAWINGS

In order to more clearly explain the technical solutions in the embodiments of the present application, the drawings required for describing the embodiments will be briefly described below. Obviously, the drawings in the description below are merely some embodiments of the present application, and those skilled in the art may also derive other drawings from these drawings without creative efforts.

DETAILED DESCRIPTION OF EMBODIMENTS

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present disclosure, it should be understood that orientations or position relationships indicated by the terms "upper", "lower", "front", "rear", "left", "right", "inside", "outside" and the like, are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term "first", "second" are for illustrative purposes only and are not to be construed as indicating or imposing a relative importance or implicitly indicating the number of technical features indicated. Thus, a feature that limited by "first", "second" may expressly or implicitly include one or more of the features. In the description of the present application, "multiple" has the meaning of two or more, unless otherwise specifically defined.

The poor side-view contrast of the existing vertical alignment display device is mainly caused by side-view light leakage in the dark state. As the viewing angle of the thin film transistor display device increases, the contrast of the picture is continuously reduced, and the definition of the picture is reduced. This is because the birefringence of the liquid crystal molecules in the liquid crystal layer changes with the observation angle. In the present application, the birefringence of the liquid crystal molecules in the liquid crystal layer is compensated by the liquid crystal compensation layer, and the liquid crystal compensation layer adjusts the compensation value by the refractive index difference of the liquid crystal molecules and the thickness, so that the adjustment range is large, the limitation is small, and the adjustment range may be matched with the high phase difference of the liquid crystal display, thereby reducing the side-view light leakage of the liquid crystal display in the dark state, thus improving the contrast of the liquid crystal display, and the image quality.

The present application provides a polarizer and a display device, which will be described in detail below. It should be noted that the order of description of the following embodiments is not a limitation of the preferred order of the embodiments of the present application.

Figure 1:
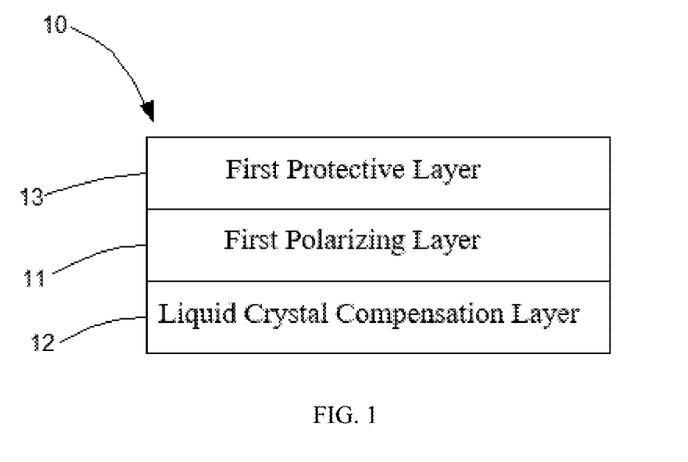
FIG. 1 is a schematic diagram of a first structure of a polarizer according to the present application.

Referring to FIG. 1, FIG. 1 is a schematic diagram of a first structure of a polarizer 10 according to the present application. The present application provides a polarizer 10, the polarizer 10 includes a first polarizing layer 11 and a liquid crystal compensation layer 12, and the liquid crystal compensation layer 12 and the first polarizing layer 11 are stacked.

The polarizer 10 of the present application adopts a structure in which the liquid crystal compensating layer 12 and the polarizing layer are stacked, in this structure, the polarizing layer plays the role of polarizing light to polarize incident light to linearly polarized light, and the liquid crystal compensation layer 12 is used to compensate the birefringence of the liquid crystal molecules in the liquid crystal layer. The compensation value is not improved by stretching the liquid crystal compensation layer 12, but is adjusted by the refractive index difference of the liquid crystal molecules and thickness, so that the adjustment range is large, the limitation is small, and the adjustment range may be matched with the high phase difference of the display device, thereby reducing the side-view light leakage of the liquid crystal display in the dark state, thus improving the contrast of the liquid crystal display, and the image quality.

The polarizing layer plays a role of polarizing light to polarize incident light to linearly polarized light. The material of the first polarizing layer 11 is a polyvinyl alcohol film, which has the characteristics of high temperature resistance and high humidity resistance. The material characteristics of temperature resistance and humidity resistance of the polyvinyl alcohol film may be achieved by adjusting the formula of the polyvinyl alcohol iodine solution, drawing ratio and drawing rate. Thus, the whole polarizer has the characteristics of high temperature resistance and high humidity resistance. Specifically, a step of determining that the polarizer has the characteristics of high temperature resistance and high humidity resistance is as follows: for the characteristic of high temperature resistance, a sample of the polarizer having a size of 40×40 mm is taken, attached to a clean glass by a roller, and placed in an environment of 80° C.×5 kgf/cm$^2$, after 15 minutes, it is determined whether the high temperature resistance under a conditions of 80° C. and 500 hours meets the specification; for the characteristic of high humidity resistance, a sample of a polarizer having a size of 40×40 mm is taken, attached to a clean glass by a roller, and placed in an environment of 80° C.×5 kgf/cm$^2$ for 15 minutes, and then it is determined whether the humidity resistance under a conditions of 60° C., 90% RH (humidity), and 500 hours meets the specification, wherein the specification is that the change rate of the single transmittance of the polarizer is less than or equal to 5%.

The liquid crystal compensation layer 12 includes a liquid crystal polymer. Compared with conventional photoelectric liquid crystal molecules, in terms of molecular structure, in addition to liquid crystal molecules, liquid crystal polymers also have one or more reactive functional groups at the ends of the liquid crystal molecules, and the combination described above may be photopolymerized into a polymer network, that is, to form a liquid crystal polymer. Since most of the polymerization initiators used are ultraviolet light-sensitive (wavelength of 254-365 nm), they are also referred to as ultraviolet-reactive liquid crystals.

The conventional optical film is usually mostly made of polymers that are stretched uniaxially or biaxially, and the isotropy due to the random arrangement of original molecular axes is changed to the anisotropy as the arrangement is deflected with the stretching direction, so that the propagation speeds of the incident light in the different directions are different, that is, the phase retardation phenomenon, which may be used to adjust or compensate the phase of the light.

The amount of phase retardation may generally be calculated by multiplying the difference Δn in biaxial refractive index of the film by the thickness d of the film, i.e., R=Δnd. Regardless of whether it is a rod-shaped or discotic liquid crystal molecule, although the overall anisotropy of the liquid crystal molecules is still dependent on the arrangement rules, the birefringence of the liquid crystal is substantially about 0.1, and the birefringence is ten times or even a hundred times that of the conventional polymer stretching film. Therefore, the thickness of the optical film produced by the liquid crystal molecules may be very small, and is very suitable for a roll-to-roll coating process.

In some embodiments, the liquid crystal compensation layer 12 is formed using a coating process, and the coating process generally includes a wire bar coating method, an extrusion coating method, a direct gravure coating method, a reverse gravure coating method, and a die coating method. Specifically, the coating process is as follows: forming a layer of alignment film on a substrate, performing a rubbing alignment process on the alignment film, and then coating liquid crystal polymers on the alignment film for alignment.

In addition, the process for forming the liquid crystal compensation layer 12 may also be as follows: forming liquid crystal polymers on a substrate, and then curing and aligning the liquid crystal polymers by ultraviolet light, and the process is quite simple and fast.

In addition, in some embodiments, the polarizer 10 further includes a first protective layer 13 disposed on a side of the first polarizing layer 11 away from the liquid crystal compensation layer 12. The material of the first protective layer 13 is any one of cellulose triacetate, polymethyl methacrylate, or polyethylene terephthalate. The first protective layer 13 serves as a protective layer for the first polarizing layer 11, and has a function of blocking moisture and may serve as a support for the entire polarizer.

Figure 2:
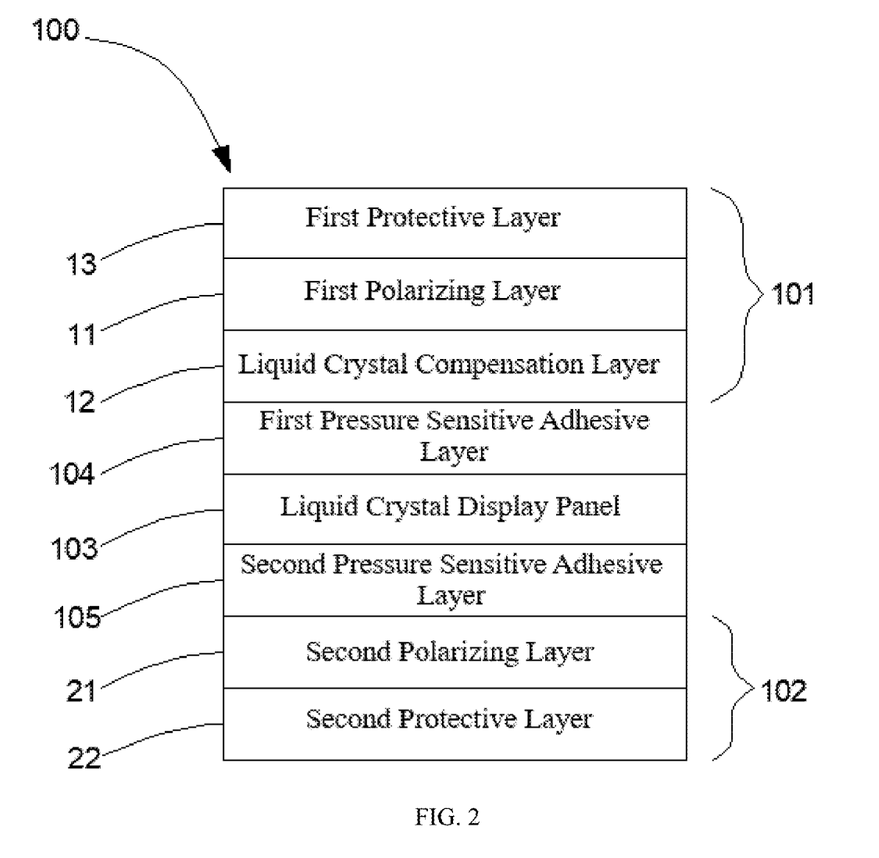
FIG. 2 is a schematic diagram of a first structure of a display device according to the present application.

Referring to FIG. 2, FIG. 2 is a schematic diagram of a first structure of a display device 100 according to the present application. The present application further provides the display device 100 including a first polarizer 101, a second polarizer 102, and a liquid crystal display panel 103; the second polarizer 102 and the first polarizer 101 are disposed opposite to each other; the liquid crystal display panel 103 is disposed between the first polarizer 101 and the second polarizer 102; the first polarizer 101 includes the polarizer 10 described above, and the liquid crystal compensation layer 12 is located between the first polarizing layer 11 and the liquid crystal display panel 103.

It may be understood that the display device 100 includes a light incident side and a light emitting side. In this embodiment, the first polarizer 101 may be the light incident side and the second polarizer 102 may be the light emitting side. Alternatively, the second polarizer 102 may be the light incident side, the first polarizer 101 may be the light emitting side, and it is not limited in this application.

An absorption axis of the first polarizer 101 is arranged at a first angle, an absorption axis of the second polarizer 102 is arranged at a second angle, the first angle is one of 90 degrees and 0 degree, and the second angle is the other of 90 degrees and 0 degree.

Referring to FIG. 2, it may be understood that the display device 100 includes an upper polarizer and a lower polarizer. The first polarizer 101 is the upper polarizer or the lower polarizer, and the second polarizer 102 is the lower polarizer or the upper polarizer. Specifically, in this embodiment, the first polarizer 101 is the upper polarizer, and the second polarizer 102 is the lower polarizer.

In the present application, the liquid crystal compensation layer 12 is provided in the first polarizer 101, and the birefringence of the liquid crystal molecules in the liquid crystal layer is compensated by the liquid crystal compensation layer 12. The liquid crystal compensation layer 12 does not increase the compensation value by stretching, but adjusts the compensation value by the refractive index difference of the liquid crystal molecules and the thickness.

Therefore, the adjustment range is large, the limitation is small, and the adjustment range may be matched with the high phase difference of the liquid crystal display, so that the side-view light leakage of the liquid crystal display in dark state may be reduced, the contrast of the liquid crystal display may be improved, and the image quality may be improved.

Figure 3:
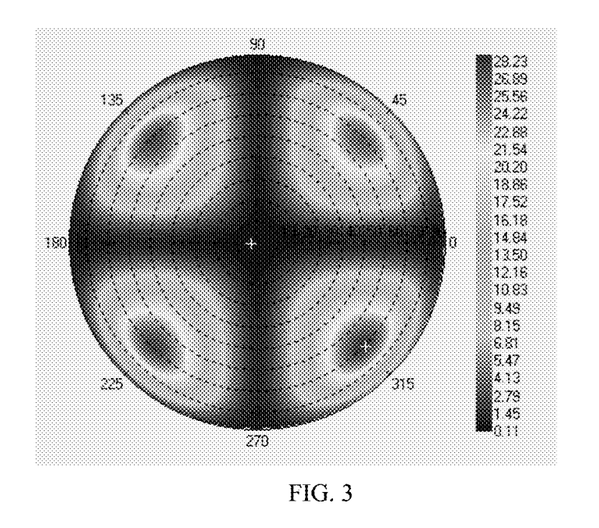
FIG. 3 is an effect diagram of viewing-angle light leakage of an existing display device in a dark state.
Figure 4:
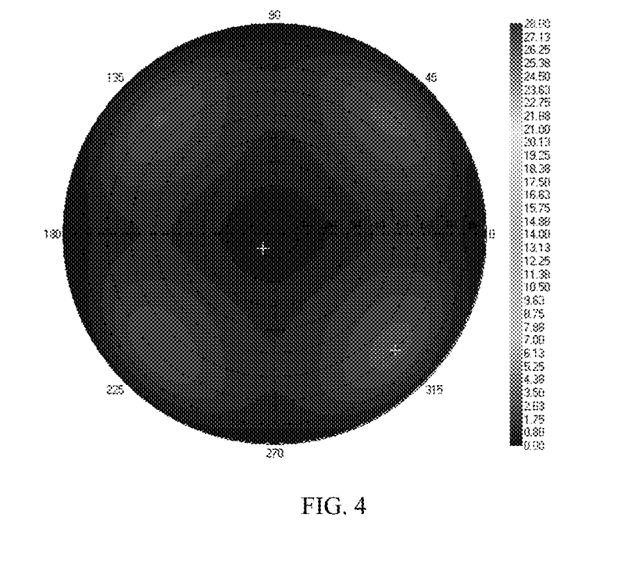
FIG. 4 is an effect diagram of viewing-angle light leakage of the display device in a dark state according to the present application.

Referring to FIGS. 3 and 4, FIG. 3 is an effect diagram of viewing-angle light leakage of an existing display device in a dark state; FIG. 4 is an effect diagram of viewing-angle light leakage of the display device in a dark state according to the present application. Referring to the following table for comparing effect, it can be seen from the comparison that the maximum light leakage at the dark state viewing angle of the existing display device is 28 nits, and the maximum light leakage at the dark viewing angle of the display device according to the present application is 2.3 nits. Therefore, the present application may greatly reduce the side-view light leakage of the liquid crystal display in the dark state, improve the contrast of the liquid crystal display, and improve the image quality.

| Table for comparing effect | | |
|---|---|---|
| | Existing display device | Display device of the present application |
| Maximum viewing-angle light leakage | 28 nits | 2.3 nits |

In some embodiments, the second polarizer 102 includes a second polarizing layer 21. The polarizing layer plays the role of polarizing light to polarize incident light to linearly polarized light. The material of the second polarizing layer 21 is a polyvinyl alcohol film, which has the characteristics of high temperature resistance and high humidity resistance. The material characteristics of temperature resistance and humidity resistance of the polyvinyl alcohol film may be achieved by adjusting the formula of the polyvinyl alcohol iodine solution, drawing ratio and drawing rate. Thus, the whole polarizer has the characteristics of high temperature resistance and high humidity resistance. Specifically, a step of determining that the polarizer has the characteristics of high temperature resistance and high humidity resistance is as follows: for the characteristic of high temperature resistance, a sample of the polarizer having a size of 40×40 mm is taken, attached to a clean glass by a roller, and placed in an environment of 80° C.×5 kgf/cm², after 15 minutes, it is determined whether the high temperature resistance under a conditions of 80° C. and 500 hours meets the specification; for the characteristic of high humidity resistance, a sample of a polarizer having a size of 40×40 mm is taken, attached to a clean glass by a roller, and placed in an environment of 80° C.×5 kgf/cm² for 15 minutes, and then it is determined whether the humidity resistance under a conditions of 60° C., 90% RH (humidity), and 500 hours meets the specification, wherein the specification is that the change rate of the single transmittance of the polarizer is less than or equal to 5%.

Further, in some embodiments, the second polarizer 102 further includes a second protective layer 22 disposed on a side of the second polarizing layer 21 away from the liquid crystal display panel 103. The material of the second protective layer 22 is any one of cellulose triacetate, polymethyl methacrylate, or polyethylene terephthalate, and the second protective layer 22 serves as a protective layer of the second polarizing layer 21, has a function of blocking moisture, and may serve as a support for the entire polarizer.

Further, in some embodiments, the display device 100 further includes a first pressure sensitive adhesive layer 104 attached to a side of the liquid crystal display panel 103 adjacent to the first polarizer 101; and a second pressure sensitive adhesive layer 105 attached to a side of the liquid crystal display panel 103 adjacent to the second polarizer 102. By providing a pressure sensitive adhesive layer as an adhesive between the liquid crystal display panel 103 and other layers, a good fixing effect may be achieved in a short time by applying a slight pressure to the pressure sensitive adhesive, the pressure sensitive adhesive layer has the advantage that it wets the contact surface as quickly as a fluid, and acts like a solid to prevent peeling when peeled. It should be noted that, as another embodiment of the present invention, a pressure sensitive adhesive may not be included. Each of the first pressure sensitive adhesive layer 104 and the second pressure sensitive adhesive layer 105 is a polypropylene adhesive.

Figure 5:
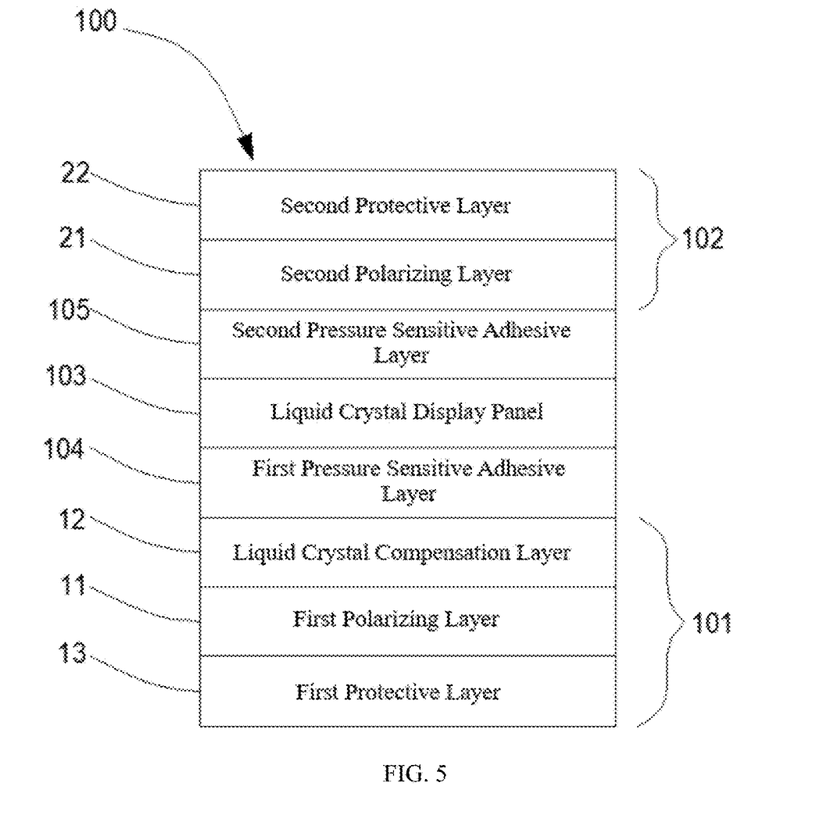
FIG. 5 is a schematic diagram of a second structure of a display device according to the present application.

Referring to FIG. 5, FIG. 5 is a schematic diagram of a second structure of a display device 100 according to the present application, and this embodiment differs from the display device 100 shown in FIG. 2 in that: the display device 100 includes an upper polarizer and a lower polarizer, the first polarizer 101 is the lower polarizer, and the second polarizer 102 is the upper polarizer.

Figure 6:
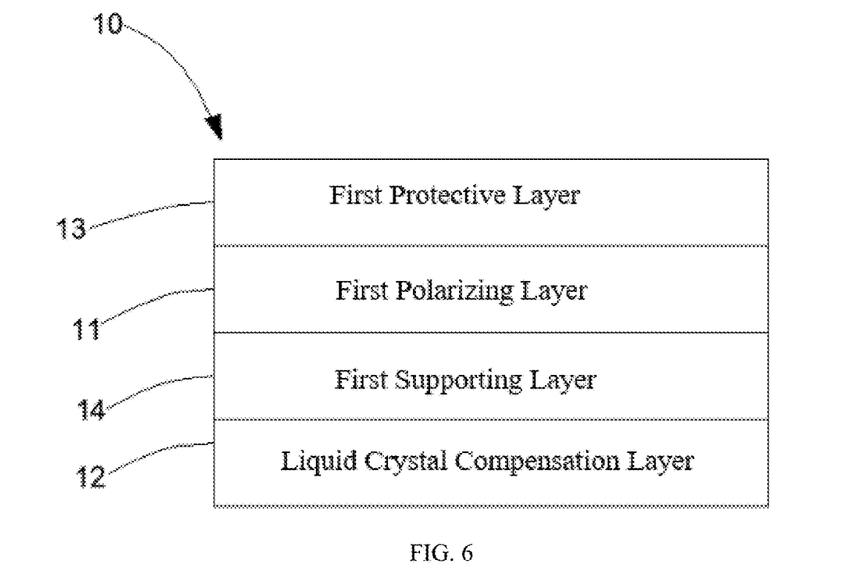
FIG. 6 is a schematic diagram of a second structure of a polarizer according to the present application.

Referring to FIG. 6, FIG. 6 is a schematic diagram of a second structure of a polarizer 10 according to the present application. In this embodiment, the polarizer 10 is different from the polarizer 10 shown in FIG. 1 in that the polarizer 10 further includes a first supporting layer 14, and the first supporting layer 14 is located between the first polarizing layer 11 and the liquid crystal compensation layer 12. The first supporting layer 14 is a cellulose triacetate film, and the cellulose triacetate has functions of blocking moisture and supporting due to its high water resistance, low thermal shrinkage, high durability, and the like. Therefore, the first supporting layer 14 may protect and support the first polarizing layer 11, and prevent the first polarizing layer 11 from shrinking. Further, since the first supporting layer 14 is a non-compensating layer, no special treatment process is required, and the manufacturing cost is low.

Figure 7:
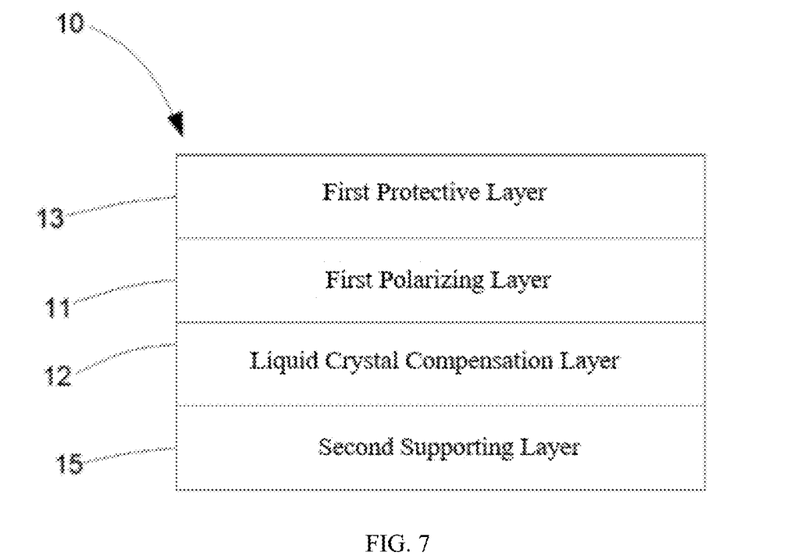
FIG. 7 is a schematic diagram of a third structure of a polarizer according to the present application.

Referring to FIG. 7, FIG. 7 is a schematic diagram of a third structure of a polarizer 10 according to the present application. In this embodiment, the polarizer 10 is different from the polarizer 10 shown in FIG. 1 in that the polarizer 10 further includes a second supporting layer 15, and the second supporting layer 15 is located on a side of the liquid crystal compensation layer 12 away from the first polarizing layer 11. The second supporting layer 15 is a cellulose triacetate film, and the cellulose triacetate has functions of blocking moisture and supporting due to its high water resistance, low thermal shrinkage, high durability, and the like. Therefore, the second supporting layer 15 may protect and support the liquid crystal compensation layer 12, and prevent the liquid crystal compensation layer 12 from shrinking. Further, since the second supporting layer 15 is a non-compensating layer, no special treatment process is required, and the manufacturing cost is low.

Figure 8:
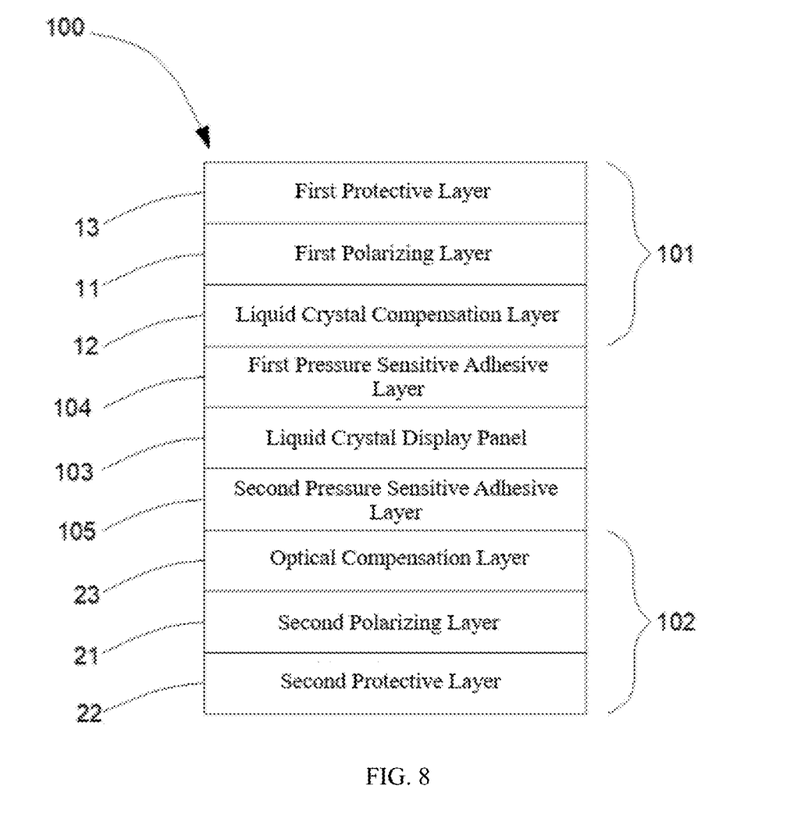
FIG. 8 is a schematic diagram of a third structure of a display device according to the present application.

Referring to FIG. 8, FIG. 8 is a schematic diagram of a third structure of a display device 100 according to the present application. This embodiment differs from the display device 100 shown in FIG. 2 in that: the second polarizer 102 further includes an optical compensation layer 23, and the optical compensation layer 23 is located between the second polarizing layer 21 and the liquid crystal display panel 103.

That is, the birefringence of the liquid crystal molecules in the liquid crystal layer is compensated by the liquid crystal compensation layer 12 on the side of the first polarizer 101. The liquid crystal compensation layer 12 does not increase the compensation value by stretching, but adjusts the compensation value by the refractive index difference of the liquid crystal molecules and the thickness. Therefore, the adjustment range is large, the limitation is small, and the adjustment range may be matched with the high phase difference of the polarizer. On the side of the second polarizer 102, the birefringence of the liquid crystal molecules in the liquid crystal layer is further compensated by the optical compensation layer 23. The compensation principle of the compensation film is generally to correct the phase difference generated by the liquid crystal at different viewing angles, so that the birefringence properties of the liquid crystal molecules may be compensated symmetrically.

The optical compensation layer 23 includes a single optical axis compensation film or a double optical axis compensation film, the single optical axis compensation film is an anisotropic birefringent film having only one optical axis. The double optical axis compensation film has two optical axes and three refractive indices, and the double optical axis compensation film has an in-plane phase difference Ro and an out-of-plane phase difference Rth in a thickness direction.

In this embodiment, the display device 100 includes an upper polarizer and a lower polarizer, the first polarizer 101 is the upper polarizer, and the second polarizer 102 is the lower polarizer.

Figure 9:
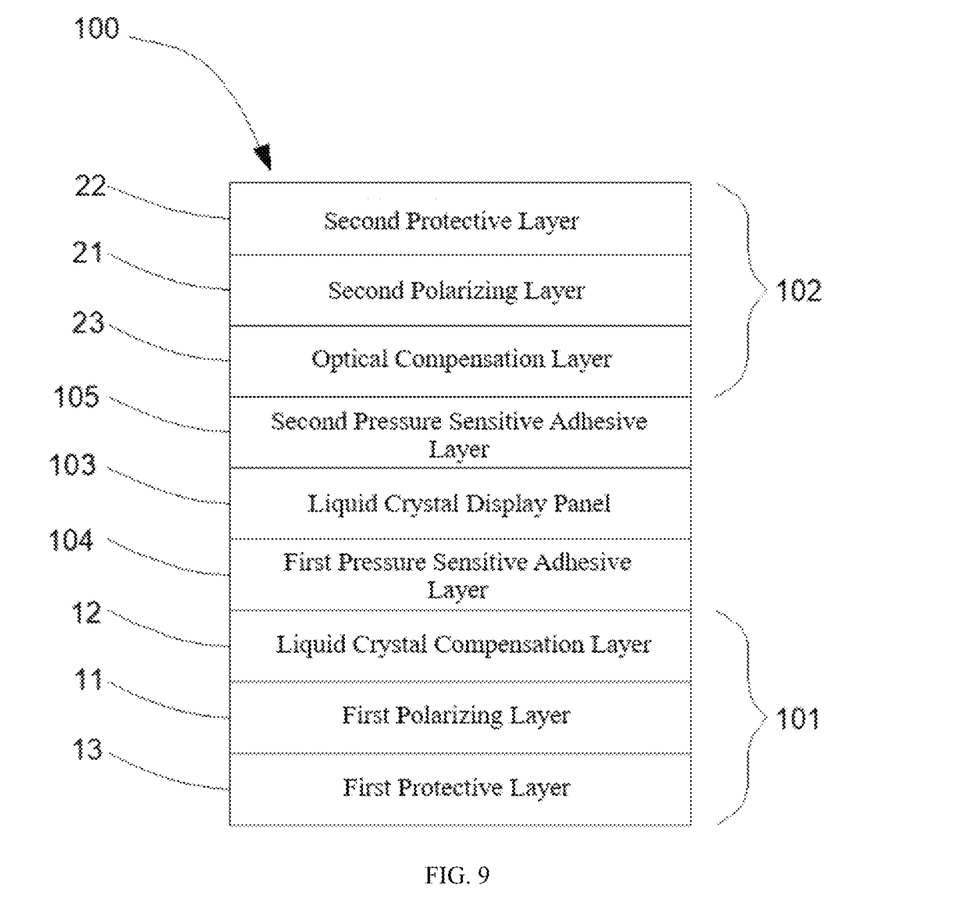
FIG. 9 is a schematic diagram of a fourth structure of a display device according to the present application.

Referring to FIG. 9, FIG. 9 is a schematic diagram of a fourth structure of a display device 100 according to the present application. This embodiment differs from the display device 100 shown in FIG. 8 in that: the display device 100 includes an upper polarizer and a lower polarizer, the first polarizer 101 is the lower polarizer, and the second polarizer 102 is the upper polarizer.

Figure 10:
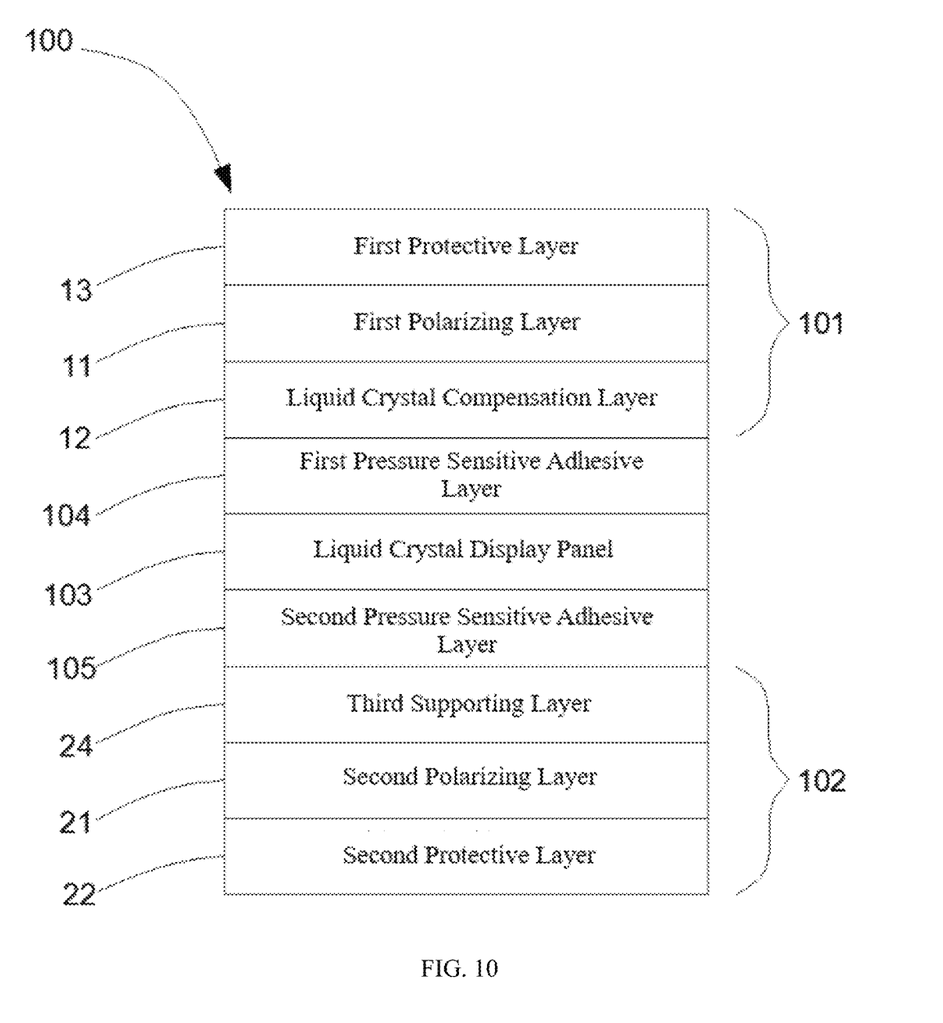
FIG. 10 is a schematic diagram of a fifth structure of a display device according to the present application.

Referring to FIG. 10, FIG. 10 is a schematic diagram of a fifth structure of a display device 100 according to the present application. This embodiment differs from the display device 100 shown in FIG. 2 in that: the second polarizer 102 further includes a third supporting layer 24, and the third supporting layer 24 is located between the second polarizing layer 21 and the liquid crystal display panel 103.

The third supporting layer 24 is a cellulose triacetate film, and the cellulose triacetate has functions of blocking moisture and supporting due to its high water resistance, low thermal shrinkage, high durability, and the like. Therefore, the third supporting layer 24 may protect and support the second polarizing layer 21 and prevent the second polarizing layer 21 from shrinking. Further, since the third supporting layer 24 is a non-compensating layer, no special treatment process is required, and the manufacturing cost is low.

In this embodiment, the display device 100 includes an upper polarizer and a lower polarizer, the first polarizer 101 is the upper polarizer, and the second polarizer 102 is the lower polarizer.

Figure 11:
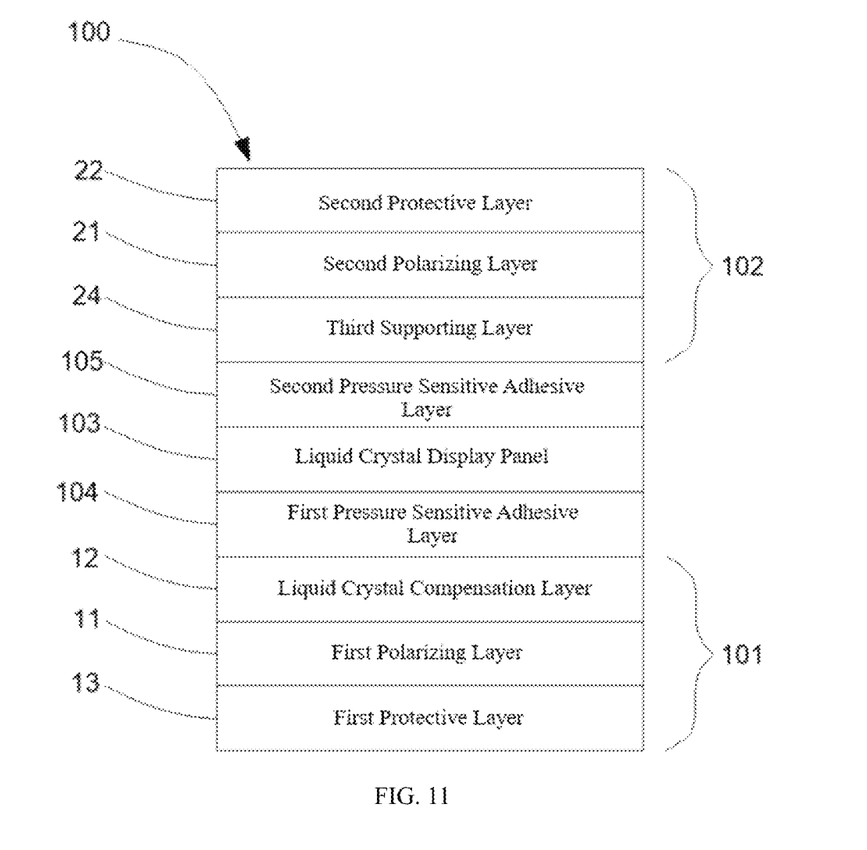
FIG. 11 is a schematic diagram of a sixth structure of a display device according to the present application.

Referring to FIG. 11, FIG. 11 is a schematic diagram of a sixth structure of a display device 100 according to the present application. This embodiment differs from the display device 100 shown in FIG. 10 in that: the display device 100 includes an upper polarizer and a lower polarizer, the first polarizer 101 is the lower polarizer, and the second polarizer 102 is the upper polarizer.

A polarizer and a display device provided in the embodiments of the present application are described in detail above. The principles and implementations of the present application are described in detail here with specific examples. The above description of the embodiments is merely intended to help understand the method and core ideas of the present application. At the same time, a person skilled in the art may make changes in the specific embodiments and application scope according to the idea of the present application. In conclusion, the content of the present specification should not be construed as a limitation to the present application.

What is claimed is:
1. A display device comprising:
a first polarizer;
a second polarizer disposed opposite to the first polarizer;
a liquid crystal display panel disposed between the first polarizer and the second polarizer;
wherein,
the first polarizing layer is a lower polarizer, the first polarizer is a light incident side, the first polarizer comprises a first polarizing layer and a liquid crystal compensation layer, the liquid crystal compensation layer is located between the first polarizing layer and the liquid crystal display panel, the first polarizing layer is located on a side of the liquid crystal compensation layer away from the liquid crystal display panel, and the liquid crystal compensation layer comprises a liquid crystal polymer composed of liquid crystal molecules, there are one or more reactive functional groups at ends of the liquid crystal molecules, and a birefringence of the liquid crystal polymer is 0.1;
wherein the second polarizer is an upper polarizer, the second polarizer is a light emitting side, the second polarizer comprises a second polarizing layer and an optical compensation layer, the optical compensation layer is located between the second polarizing layer and the liquid crystal display panel, and the optical compensation layer comprises a single optical axis compensation film.

2. The display device according to claim 1, wherein the second polarizer further comprises a second protective layer, and the second protective layer is disposed on a side of the second polarizing layer away from the liquid crystal display panel.

3. The display device according to claim 1, wherein the second polarizer further comprises a second supporting layer, and the second supporting layer is located between the optical compensation layer and the liquid crystal display panel.

4. The display device according to claim 2, wherein a material of the second protective layer is any one of cellulose triacetate, polymethyl methacrylate, or polyethylene terephthalate.

5. The display device according to claim 1, wherein the first polarizer further comprises a first protective layer, and the first protective layer is disposed on a side of the first polarizing layer away from the liquid crystal compensation layer.

6. The display device according to claim 1, wherein the polarizer further comprises a third supporting layer, and the third supporting layer is located between the first polarizing layer and the liquid crystal compensation layer.

7. The display device according to claim 5, wherein a material of the first protective layer is any one of cellulose triacetate, polymethyl methacrylate, or polyethylene terephthalate.

\* \* \* \* \*